United States Patent Office 2,733,734
Patented Feb. 7, 1956

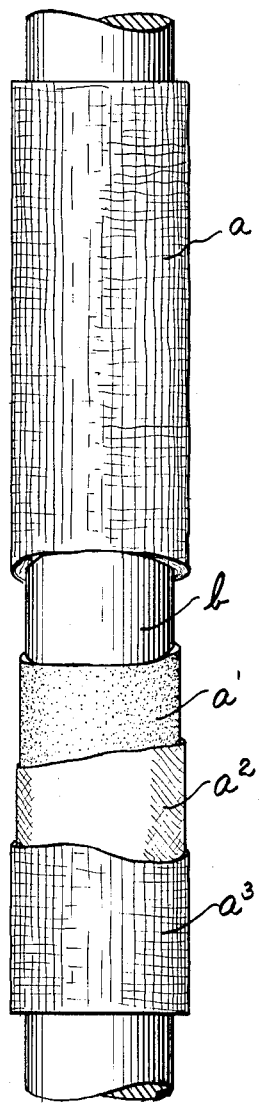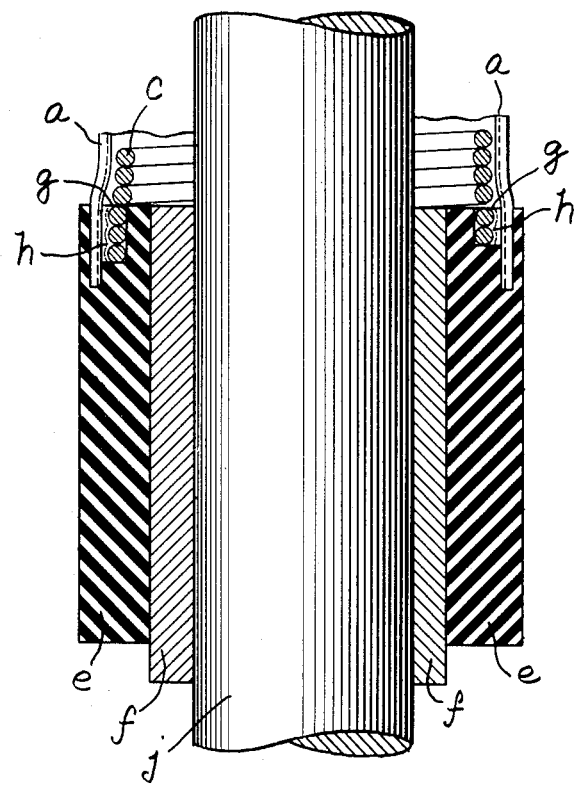

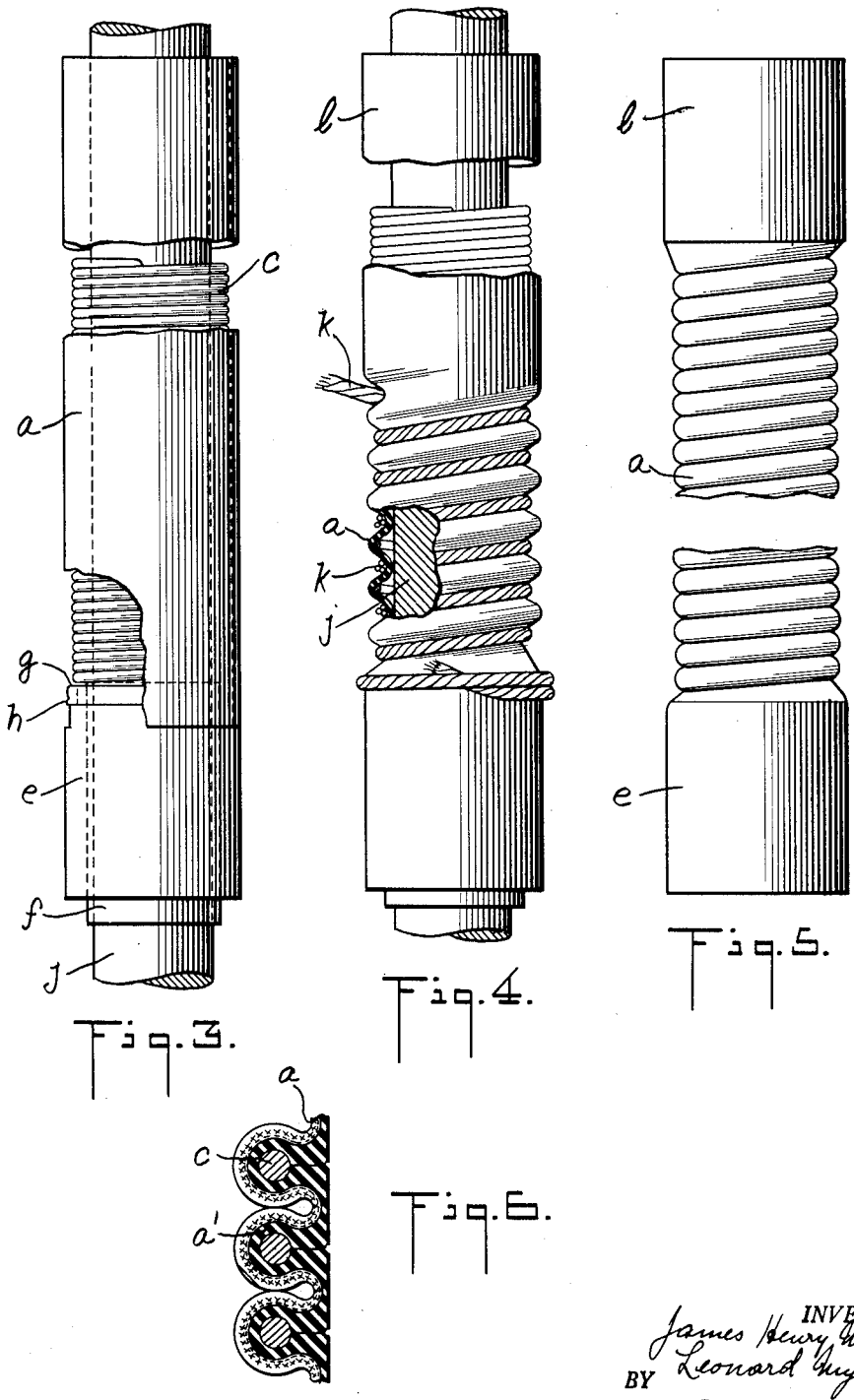

2,733,734

FLEXIBLE AND EXTENSIBLE HOSE

James H. Woodward and Leonard Myles, Manchester, England, assignors to Dunlop Tire and Rubber Corporation, Buffalo, N. Y., a corporation of New York Application June 23, 1953, Serial No. 363,466

9 Claims. (Cl. 138—56)

Our invention relates to flexible and extensible hose, particularly hose of the type employed for use with gas masks and oxygen-breathing apparatus.

Hose for the above purpose must be flexible and extensible and must be free from any risk of internal collapse which would restrict the passage of gas through it. Further, it is desirable that it should present as free a passage as possible to any gas passing through it and should be resistant to wear, particularly wear caused by frequent flexing.

Various constructions of hose of the above type have been described which comprise an impermeable tube made of rubber or other suitable material and a resilient wire helix with or without a layer of fabric.

Our present invention provides improved construction of flexible extensible hose which is resistant to abrasion, offers little resistance to fluid flow and can be made by a simple and cheap method.

According to our invention flexible extensible hose comprises an internal helical reinforcement of wire or other resilient material enclosed in a flexible impermeable corrugated tube wherein the coils of the helix are held apart by the corrugations of the tube and the tube is free to extend by reduction of the depth of the corrugations on extension of the helix.

According to a preferred method of manufacturing the hose by our invention, a flexible impermeable tube comprising a partially vulcanized rubber composition is assembled over a resilient extensible wire helix, the tube is wrapped with string or the like to form corrugations lying between the convolutions of the helix and is vulcanized while so wrapped and finally the string is removed. In this manner hose is obtained which is flexible and can be extended axially since the corrugated portions of the tube lying between the convolutions of the helix are free to change their formation and become reduced in depth.

Preferably also the pitch of the helix is adjusted before vulcanization of the rubber to ensure that the finished tube in unextended and undistorted form has a smooth bore.

One method of manufacturing hose in accordance with our invention is illustrated by way of example in the accompanying drawings in which Fig. 1 is a side view of a fabric reinforced rubber tube to form the inner element of a tube embodying our invention, parts being broken away to show the construction;

Fig. 2 shows the construction of a wire helix and end cuff to reinforce the tube of Fig. 1;

Fig. 3 is a side view showing the arrangement of the assembled rubber tube and inner wire reinforcement on a mandrel prior to shaping or corrugating the rubber tube on the wire helix;

Fig. 4 is a side view, partly in section, showing the wrapping of the assembly of Fig. 3 with string to corrugate the rubber tube between the coils of the spring;

Fig. 5 shows an elevation of a length of finished hose embodying the invention;

Fig. 6 shows a fragmentary longitudinal section of the hose shown in Fig. 5.

A composite tube $a$ is first formed as follows:

A thin tube $a'$ (Fig. 1) of unvulcanized natural or synthetic rubber on a steel mandrel $b$ is wrapped with a strip $a^2$ of rubber-impregnated fabric cut on the bias, the strip being sufficiently wide to provide for an overlap of about $\frac{1}{4}$". The outside of the fabric is cleaned with a rubber solvent and is then treated with a coat of rubber adhesive solution and allowed to dry. A length of tubular stockinet material $a^3$ of suitable diameter is cut so that in its stretched condition it is equal to the length of the fabric-covered tube and fits snugly over it. The stockinet $a^3$ is then passed over the tube and stretched so that its ends coincide with the ends of the fabric $a^2$ and the assembly is spirally wrapped with a temporary covering, not shown, to consolidate the construction. Partial vulcanization may be necessary at this stage to avoid excessive thinning of the rubber tube where it comes in contact with the wire next described.

Where partial vulcanization to avoid excessive thinning is not desirable, the fabric $a^2$ is provided with a thin rubber topping. The thickness of this topping is of the order of 0.010 inch.

The reinforcement consists of a coil of galvanized steel wire $c$ (Figs. 2–4 and 6) of 18 S. W. G. and 80 to 90 tons per square inch tensile strength spun with the convolutions in contact or slightly apart and having a diameter such that it will slide easily within the prepared composite tube $a$. A resilient end cuff $e$ (Fig. 2) free of wire to fit a coupling is prepared on a tubular sleeve $f$ on a second mandrel $j$ of size to correspond with the outside diameter of the coupling and the wire coil $c$ is then passed over the cuff and three turns $g$ of the coil $c$ attached to the cuff end with a strip of rubber-impregnated fabric $h$.

The temporary spiral wrapping is removed from the tube $a$ and the tube is passed over the wire helix $c$ and attached to the three end turns $g$ of the coil on the prepared cuff $e$, and the cuff bound with tape to the mandrel $j$ (Fig. 3). The tube is then wrapped with string $k$ (Fig. 4) in order to force it between the convolutions of the helix $c$ with the exception of the three convolutions at each end, after which an end cuff $l$ is attached to the other end. The end cuff $l$ is rotated on the mandrel $j$ to correct the pitch of the turns of the helix to that necessary to obtain a smooth bore in the finished hose and is then bound to the mandrel with tape. The complete hose is then spirally wrapped with a temporary covering, not shown, and vulcanized. After vulcanization the wrapping and string are removed and the finished hose (Figs. 5 and 6) is taken off the mandrel.

Hose produced as described above caused a lower pressure drop per foot length using various rates of flow of air with external pressures corresponding with atmospheric pressure at sea level and 40,000 feet altitude and showed a much greater resistance to abrasion than any known hose produced for the same uses as mentioned.

Having described our invention, what we claim is:

1. Reinforced flexible and extensible hose which comprises a wire helix and an impermeable tube of fabric reinforced rubber formed about the turns of the helix and inwardly between said turns in a spiral fold and spreading within said helix so that contiguous turns of said spiral fold form a substantially smooth cylindrical inner surface of said hose entirely within the inner periphery of said helix.

2. The reinforced flexible and extensible hose of claim 1 in which said fabric reinforced rubber tube has an inner lining of rubber about the wire of said helix and forming the cylindrical inner surface of said hose.

3. The reinforced flexible and extensible hose of claim 1, in which said fabric is biased to the length of said hose.

4. The reinforced flexible and extensible hose of claim 2 having a covering of stockinet fabric on said fabric reinforced rubber.

5. The reinforced flexible and extensible hose of claim 1 in which said wire is a metallic wire.

6. The reinforced flexible and extensible hose of claim 1 in which said wire is galvanized steel.

7. The reinforced flexible and extensible hose of claim 2 in which the turns of said helix are held in spaced position by said fold between the turns of said helix.

8. The reinforced flexible and extensible hose of claim 7 in which said fold spreads within said helix to form a helical space in the bight of said fold.

9. A method of forming a reinforced flexible and extensible hose which comprises enclosing a wire helix in a tube of fabric reinforced rubber, winding a cord about said tube between the turns of said helix to draw said tube between the turns of said helix to an inner cylindrical surface, twisting said helix to a pitch to bring the inner surface of said tube to a smooth bore on the cylindrical surface, vulcanizing said rubber of said tube on the coils of said helix and removing said cord.

References Cited in the file of this patent

UNITED STATES PATENTS

| | | |
|---|---|---|
| 425,283 | Wright | Apr. 8, 1890 |
| 1,746,701 | Kimmich | Feb. 11, 1930 |
| 2,140,638 | Maclachlen | Dec. 20, 1938 |
| 2,396,059 | Roberts | Mar. 5, 1946 |
| 2,430,081 | Roberts et al. | Nov. 4, 1947 |
| 2,508,774 | Roberts | May 23, 1950 |
| 2,550,099 | Vance | Apr. 24, 1951 |
| 2,560,369 | Roberts | July 10, 1951 |
| 2,597,806 | Martin | May 20, 1952 |
| 2,609,002 | Meissner | Sept. 2, 1952 |

FOREIGN PATENTS

| | | |
|---|---|---|
| 448,933 | Great Britain | June 17, 1936 |